L. J. HUNT.
ALTERNATING CURRENT DYNAMO ELECTRIC MACHINE ADAPTED FOR SYNCHRONOUS WORKING.
APPLICATION FILED FEB. 10, 1919.

1,328,520.

Patented Jan. 20, 1920.
2 SHEETS—SHEET 1.

Inventor:
Louis J. Hunt,
by *Albert G. Davis*
His Attorney.

L. J. HUNT.
ALTERNATING CURRENT DYNAMO ELECTRIC MACHINE ADAPTED FOR SYNCHRONOUS WORKING.
APPLICATION FILED FEB. 10, 1919.

1,328,520.

Patented Jan. 20, 1920.
2 SHEETS—SHEET 2.

Inventor:
Louis J. Hunt,
by Albert G. Davis
His Attorney.

UNITED STATES PATENT OFFICE.

LOUIS JOHN HUNT, OF SANDYCROFT, WALES.

ALTERNATING-CURRENT DYNAMO-ELECTRIC MACHINE ADAPTED FOR SYNCHRONOUS WORKING.

1,328,520.   Specification of Letters Patent.   Patented Jan. 20, 1920.

Application filed February 10, 1919. Serial No. 276,001.

*To all whom it may concern:*

Be it known that I, LOUIS JOHN HUNT, a subject of the King of Great Britain, and resident of Sandycroft, in the county of Flint, North Wales, have invented certain new and useful Improvements in or Relating to Alternating-Current Dynamo-Electric Machines Adapted for Synchronous Working, of which the following is a specification.

This invention relates to alternating current dynamo electric machines adapted for synchronous working, and it relates particularly to starting and controlling means for use with machines of the type having a rotor winding with connections for operating at two different pole numbers, either separately or in cascade. Such machines when arranged to operate as synchronous motors at the cascade speed can be started and run up to about the synchronous speed while running as induction motors on one of the basic pole numbers, whereupon the connections are changed to those for cascade working and the machine is synchronized. It is the object of the present invention to provide improved starting and controlling means for machines of this type whereby any risk of damaging the machine due to fluctuations in the line current on synchronizing or due to high mechanical stresses set up on synchronizing are avoided as far as possible. This object is attained according to the present invention by the methods hereinafter set forth and explained with reference to the accompanying drawings, which illustrate by way of example some forms of construction according to the invention.

In the drawings:—

In each of the figures, the rotor winding is represented by a triangle with radiating arms connected to slip rings 11, and intermediate arms connected to slip rings 16. The portions of the windings connected to slip rings 11 are the portions used when connections are made for working with one pole number, while the portions of the windings connected to slip rings 16 are those which are used for working with the other pole number, as illustrated and described for instance in British Patent No. 9,261 of 1913 or in U. S. Patent No. 1,160,717. The winding is only illustrated diagrammatically here as it is not novel *per se*, and the invention relates only to the means for effecting the connections of such a rotor winding for the purposes herein set forth.

Figure 1:
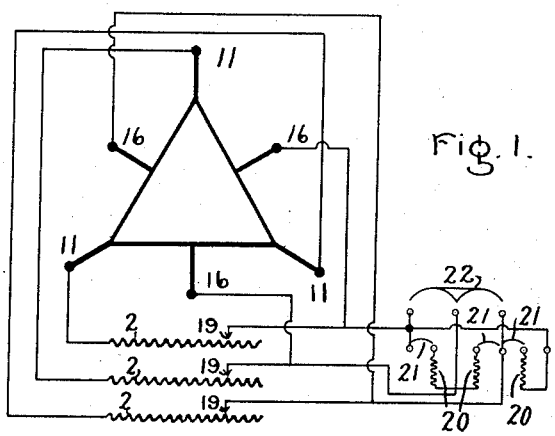
Figure 1 is a diagram showing the rotor winding with one arrangement for starting purposes.

In Fig. 1, the slip rings 11 of the rotor winding are connected to resistances 2, while the slip rings 16 are connected to brushes 19 which are moved simultaneously over these resistances during starting. The slip rings 16 are also adapted to be inter-connected during starting through resistances 20 by means of switches 21, and to be short circuited afterward by a switch 22. During starting, the brushes 19 are moved as before, so as to decrease the resistances 2 between opposite terminals of the winding until synchronous speed is approximately reached. The resistances 20 are then connected across the slip rings 16, the effect of which is to provide a local path through which currents can flow to produce the fields of both of the basic pole numbers.

The switch 22 is then closed to short-circuit resistances 20, producing the conditions for synchronous running, and the brushes 19 are lifted off the contacts of resistances 2 or the rings 11 are otherwise open circuited. The connections of slip rings 11 and 16 may be interchanged according to the basic pole number on which it is desired to effect the starting. The switches 21 may be arranged to cut in the resistances 20 gradually if required.

Figure 2:
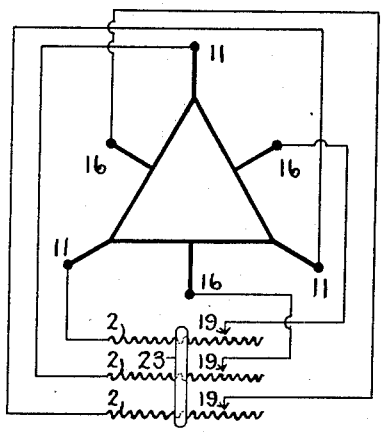
Figs. 2, 3 and 4 are similar diagrams showing other modified arrangements.

By a little modification it is possible to avoid the use of additional resistances such as 20, and the switches 21 and 22. For example in Fig. 2 a bar 23 is shown permanently interconnecting the resistances 2 at a mid-point. In this case, the contacts 19 are at the right hand end of resistances 2 at the commencement of the starting up of the motor, and the result is at first to build up two equal cascade effects in the windings, which neutralize one another as regards the second field, so that there is no synchronizing effect; but as the contacts 19 move toward the left, cutting out parts of the resistances 2 toward the right of bar 23, the balance is gradually upset with the result that the second field, say the 4-pole field, is gradually strengthened, until just before the contacts 19 reach the connecting bar 23, when the synchronizing effect is completed with the last stage of movement which short circuits the one set of slip rings 16 through the bar 23. All that then remains to be done is to open circuit the other set of slip rings at any convenient point, either by opening their connection to the resistances 2, or by interrupting the connection between the left-hand halves of the resistances on the one hand, and their right-hand halves with the short circuiting bar 23 on the other hand for example.

Figure 3:
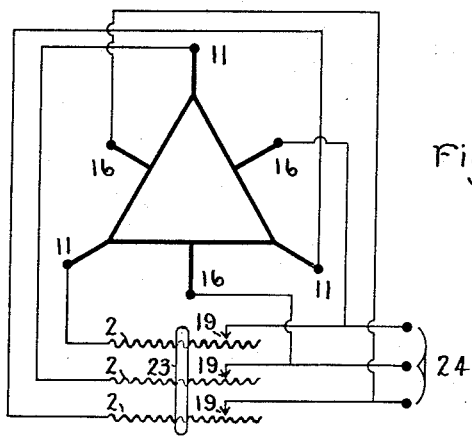

There may be objections in practice to this method of attaining the result, owing for example to the local currents produced in the stator winding, and it may be preferable to operate on a slightly different plan, as indicated in Fig. 3, by effecting the starting at first by moving the contacts 19 toward the left, and then inserting the bar 23 connecting corresponding points in the three resistances 2, at a suitable stage when the required speed has been approximately attained. The bar 23 is then put into circuit so as to divide the resistances between brushes 19 and rings 11 into two unequal parts so as to produce the unbalanced cascade field giving the resultant synchronizing effect. A separate short circuiting switch 24 can then be closed, and the slip rings 11 can be open circuited as before. In this operation the bar 23 connecting corresponding points in the resistances may be moved from left to right so as to increase the unbalancing effect, either while the resistance contacts 19 are being moved to cut out in stages the resistances 2 between the points treated as opposite points in the windings, or the bar 23 may be moved with respect to the resistances after the contacts 19 have been brought to their final position during speeding up of the motor.

Figure 4:
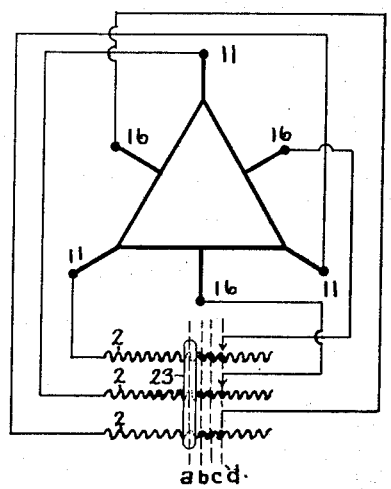

Fig. 4 shows such an arrangement, in which the bar 23 is first closed across resistances 2 at $a$, and is subsequently moved to positions $b$, $c$ and $d$ successively, short-circuiting the slip rings 16 in the last position, before the slip rings 11 are opened out altogether.

I have spoken above of a "bar" 23 for convenience in referring to the diagram of connections, but of course it may be a separate switch which is used having separate contacts on the starting resistances 2, or any suitable equivalent arrangement may be used to secure the result aimed at. The movement of the bar 23 over the starting resistances 2 as well as the movements of the starting switch with the contacts 19, might be controlled automatically through a suitable gear, comprising means for controlling the starting switch 19 according to the current flowing, and means for controlling the cutting in of the connecting bar 23 across the resistances 2 according to the speed of running, so that the bar 23 would be connected in circuit at the required moment during speeding up. If its points of contact with the resistances were controlled thereafter as in Fig. 4, the control would be linked with that of the starting switch 19 for example, if the simultaneous adjustment of both were required. It will not be necessary to give here further details of mechanisms suitable for these purposes, as various mechanisms are known for effecting the control of electrical apparatus according to a current flowing or to the speed of running of some member.

At the same time as the resistances as above set forth are being used in the rotor circuit, it may be desirable to arrange for the direct current stator circuit to be closed through resistances, which are cut out on synchronizing.

Figure 5:
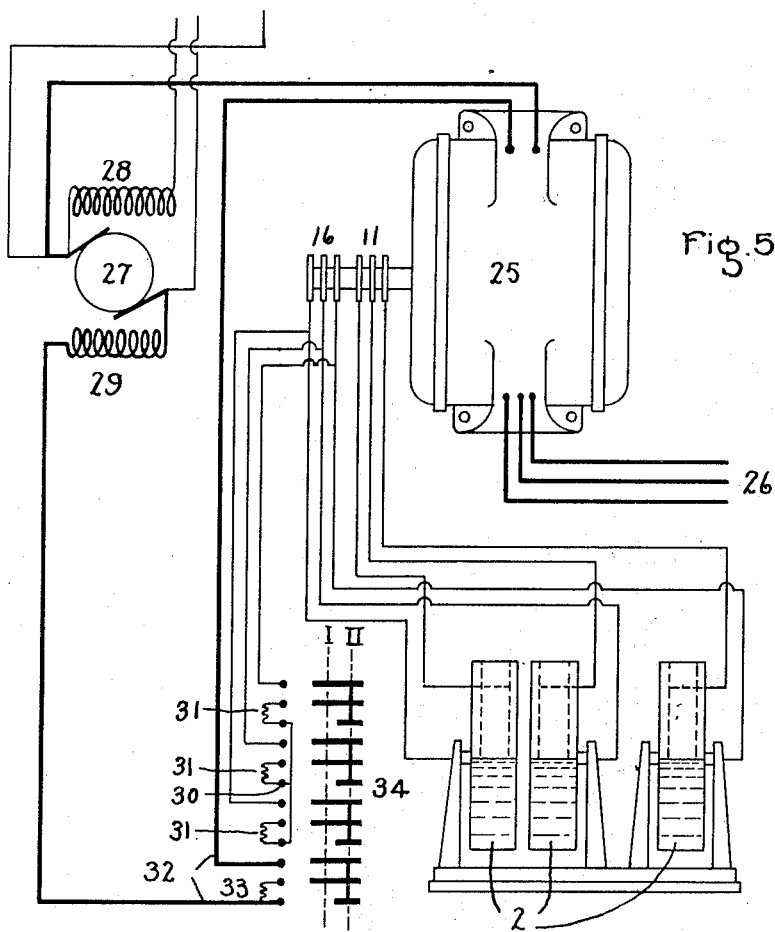
Fig. 5 is a diagram showing a motor with its connections and switches for starting according to the method of Fig. 1.

Fig. 5 shows in diagrammatic form the controller arrangements of a synchronous motor, started by a method equivalent to that of Fig. 1. The motor 25 is supplied with three-phase current from a suitable source through leads 26, while the direct current is derived from a coupled exciter the armature of which is marked 27. This has a shunt field 28 which is suitably controlled, and an interpole field 29. The sets of slip rings are marked 11 and 16; they are connected in pairs to the terminals of liquid starter resistances 2, and the slip rings of the set 16 are also connected to the terminals of a combined synchronizing and field switch, which may be mounted on the motor frame. This switch has a bar 30 adapted to form a star connection for the slip rings 16, and also connected through resistances 31 to additional contacts adjacent the short circuiting contacts. The direct current excitation leads 32 are also brought to contacts in the switch, and one of them is connected through a resistance 33 to an additional contact. The contact maker or brush portion 34 of the switch is shown detached, the two lines marked I and II indicating its two positions in synchronizing. In position I, the slip rings 16 are connected therough resistances 31 to bar 30, and the direct current excitation circuit is closed through resistances 33; in the next or final synchronizing position marked II, the slip rings 16 are connected in star through bar 30, and the direct current leads 32 are directly connected, all the resistances in the switch being thus cut out. The liquid starter 2 is of course first manipulated in starting the motor, to insert and control the resistances between the corresponding slip rings of the sets 11 and 16 until the motor is rotating at approximately the synchronous speed, when the synchronizer switch brushes 34 are moved, first to position I and then to position II to complete the synchronizing, after which finally the liquid starter is moved to open circuit the slip rings 11.

It will be understood that in all of the arrangements described, the connections of the two sets of slip rings 11 and 16 may be interchanged, and the resistances employed may be of any suitable type depending on the size of the machine and the currents to be dealt with. The resistances 31 and 33 in Fig. 5 for example may also be arranged to be cut out in two or more stages if required. Such details will be obvious without further explanation.

What I claim as my invention and desire to secure by Letters Patent is:—

1. The combination with an alternating current dynamo electric machine having windings on its rotor portion adapted to operate with two different pole numbers either separately or in cascade, and windings on its stator portion adapted to operate both with alternating currents and with a direct current for synchronous working purposes, of two sets of slip rings connected to separate points in the rotor winding, the one set for the one pole number and the other set for the other pole number, a plurality of starting resistances corresponding in number to the number of slip rings in each set, connections from the one set of slip rings to such resistances, means for connecting the slip rings of the other set severally to such resistances, means for connecting the one set of slip rings in star through resistances, and means for open circuiting the other set of slip rings.

2. The combination with an alternating current dynamo electric machine having windings on its rotor portion adapted to operate with two different pole numbers either separately or in cascade, and windings on its stator portion adapted to operate both with alternating currents and with a direct current for synchronous working purposes, of two sets of slip rings connected to separate points in the rotor winding, the one set for the one pole number and the other set for the other pole number, a plurality of starting resistances corresponding in number to the number of slip rings in each set, connections from the one set of slip rings to such resistances, means for connecting the slip rings of the other set severally to such resistances, a set of separate resistances, a controller having contacts adapted in one position to connect the one set of slip rings in star through such separate resistances, and adapted in another position to connect the one set of slip rings directly in star.

3. The combination with an alternating current dynamo electric machine having windings on its rotor portion adapted to operate with two different pole numbers either separately or in cascade, and windings on its stator portion adapted to operate both with alternating currents and with a direct current for synchronous working purposes, of two sets of slip rings connected to separate points in the rotor winding, the one set for the one pole number and the other set for the other pole number, a plurality of starting resistances corresponding in number to the number of slip rings in each set, connections from the one set of slip rings to such resistances, means for connecting the slip rings of the other set severally to such resistances, a set of separate resistances, a controller having contacts adapted in one position to connect the one set of slip rings in star through such separate resistances and adapted in another position to connect the one set of slip rings directly in star, said controller including means for connecting the stator portion of the winding of the machine to the direct current supply simultaneously with the connection of the one set of slip rings of the rotor winding in star.

LOUIS JOHN HUNT.